United States Patent [19]

McCombie

[11] Patent Number: 5,544,521
[45] Date of Patent: Aug. 13, 1996

[54] ENGINE MISFIRE DETECTION WITH ROUGH ROAD INHIBIT

[75] Inventor: Jay C. McCombie, Rochester Hills, Mich.

[73] Assignee: Chrysler Corporation, Auburn Hills, Mich.

[21] Appl. No.: 469,040

[22] Filed: Jun. 6, 1995

[51] Int. Cl.$^6$ .................................................. G01M 15/00
[52] U.S. Cl. ..................... 73/117.3; 123/419; 364/431.07
[58] Field of Search ................................... 73/116, 117.2, 73/117.3; 123/419, 436; 364/431.07, 431.08

[56] References Cited

U.S. PATENT DOCUMENTS

| | | | |
|---|---|---|---|
| 3,908,366 | 9/1975 | Masaki | 60/277 |
| 4,179,922 | 12/1979 | Bouverie et al. | 73/116 |
| 4,186,701 | 2/1980 | Suzuki et al. | 123/119 A |
| 4,271,811 | 6/1981 | Suzuki et al. | 123/571 |
| 4,308,519 | 12/1981 | Garcea et al. | 77/8 |
| 4,461,257 | 7/1984 | Hosaka et al. | 123/419 |
| 4,488,528 | 12/1984 | Morikawa | 123/425 |
| 4,491,110 | 1/1985 | Bone et al. | 123/425 |
| 4,532,592 | 7/1985 | Citron et al. | 364/431.05 |
| 4,562,818 | 1/1986 | Kohama et al. | 123/478 |
| 4,606,224 | 8/1986 | Tedeschi et al. | 73/117.3 |
| 4,691,288 | 9/1987 | Kay et al. | 73/116 |
| 4,716,874 | 1/1988 | Hilliard et al. | 123/425 |
| 4,782,692 | 11/1988 | Peden et al. | 73/117.3 |
| 4,846,129 | 7/1989 | Noble | 123/425 |
| 4,862,093 | 8/1989 | Jiewertz | 324/464 |
| 4,886,029 | 12/1989 | Lill et al. | 123/479 |
| 4,928,228 | 5/1990 | Fujimoto et al. | 364/431.09 |
| 4,930,479 | 6/1990 | Osawa et al. | 123/436 |
| 4,930,481 | 6/1990 | Fujimoto et al. | 123/481 |
| 4,932,379 | 6/1990 | Tang et al. | 123/436 |
| 4,936,277 | 6/1990 | Deutsch et al. | 123/436 |
| 4,941,445 | 7/1990 | Deutsch | 123/414 |
| 4,976,241 | 12/1990 | Ishida et al. | 123/425 |
| 4,987,711 | 1/1991 | Noji et al. | 52/167 DF |
| 4,987,771 | 1/1991 | Iwata | 73/117.3 |
| 5,021,960 | 6/1991 | Manaka et al. | 364/431.01 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,105,372 | 4/1992 | Provost et al. | 73/116 |
| 5,109,695 | 5/1992 | James et al. | 73/117.3 |
| 5,117,681 | 6/1992 | Dosdall et al. | 73/116 |
| 5,144,927 | 9/1992 | Denz | 123/425 |
| 5,200,899 | 4/1993 | Ribbens et al. | 73/117.3 |
| 5,231,869 | 8/1993 | Klenk et al. | 73/116 |
| 5,239,473 | 8/1993 | Ribbens et al. | 73/117.3 |
| 5,287,737 | 2/1994 | Osawa et al. | 73/117.3 |
| 5,361,629 | 11/1994 | McCombie | 73/117.3 |
| 5,392,641 | 2/1995 | McCombie | 73/117.3 |
| 5,440,922 | 8/1995 | Ichikawa | 73/117.3 |

*Primary Examiner*—Richard Chilcot
*Assistant Examiner*—George M. Dombroske
*Attorney, Agent, or Firm*—Mark P. Calcaterra

[57] ABSTRACT

An apparatus and method are provided for detecting cylinder misfires in an internal combustion engine of a motor vehicle and inhibiting misfire detection during the presence of noise related events. Misfire detection is performed to detect the occurrence of one or more misfire events. Crankshaft rotation is sensed and crankshaft velocities are measured for each cylinder and changes in angular velocity are determined for each cylinder firing event. Angular velocity changes are sorted and averaged to provide an average change in velocity value and a deviation value is determined. The deviation is compared to a threshold value and misfire events are determined based on the comparison. A comparison value is determined as a function of change in positive deviations of change of velocity and a time decay rate. The comparison value is compared with a threshold value. Misfire detection is disabled or inhibited when the comparison value exceeds the threshold value. The comparison value is reduced with the time decay rate.

10 Claims, 6 Drawing Sheets

ENGINE MISFIRE DETECTION WITH ROUGH ROAD INHIBIT

CROSS-REFERENCE TO RELATED APPLICATIONS

This application relates to the following simultaneously filed patent applications titled "Engine Misfire Detection with Compensation for Normal Acceleration of Crankshaft" having Ser. No. 08/468,117 and application titled "Engine Misfire Detection with Cascade Filter Configuration" having Ser. No. 08/46,113. These related applications are hereby incorporated by reference.

BACKGROUND OF THE INVENTION

1. Technical Field

The present invention relates generally to internal combustion engines and, more particularly, to a misfire detection apparatus and method for detecting misfire of individual cylinders in an internal combustion engine and inhibiting misfire detection for noise related events such as a rough road condition.

2. Discussion

The Clean Air Act (1955) required motor vehicle manufacturers to reduce exhaust emissions of carbon monoxide, hydrocarbons, and oxides of nitrogen from light duty motor vehicles. To comply with the Act, most motor vehicle manufacturers generally use catalytic converters on production vehicles to control such exhaust emissions. A catalytic converter typically includes a catalyst and operates at a very high temperature in order to burn unwanted byproducts of combustion so as to reduce hydrocarbons, carbon monoxide and nitrous oxide. However, increased amounts of unburned byproducts that often remain after the occurrence of an engine misfire can lead to damage of the catalytic converter.

More recently, regulatory agencies have proposed that passenger, light-duty and medium-duty motor vehicles with feedback fuel control systems be equipped with a malfunction indicator function that will inform the motor vehicle operator of any malfunction of an emission-related component that interfaces with an on-board computer of the motor vehicle. it is also proposed or required that an on-board diagnostic system identify the likely area of malfunction. Proposals or requirements have set forth catalyst, misfire, evaporative purge system, secondary air system, air conditioning system refrigerant, fuel system, oxygen sensor, exhaust gas recirculation, and comprehensive component monitoring requirements.

As previously mentioned, misfire of internal combustion engines can cause damage to the catalyst of a catalytic converter. With respect to misfire, the identification of the specific cylinder experiencing misfire may be required. Some regulations provide that the motor vehicle manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a durability demonstration motor vehicle to fail a Federal Test Procedure (FTP) by more than 150% of the applicable standard if the degree of misfire were present from the beginning of the test; and (3) the degree of misfire evaluated in a certain number of revolution increments which would cause a durability demonstration motor vehicle to fail an inspection and maintenance (IM) program tailpipe exhaust emission test.

Current and proposed future regulations are also requiring that motor vehicle manufacturers be able to provide information detailing the occurrence of misfires such as identifying which cylinders are responsible for one or more misfires. The misfire information need be collected and stored in memory so that the stored information may be downloaded at a service center and used to determine the cause of misfires in the vehicle. One misfire detection and identification approach is disclosed in issued U.S. Pat. No. 5,361,629 issued Nov. 8, 1994 and titled "Single Sensor Misfire Detection Apparatus and Method for an Internal Combustion Engine". The above-cited patent is also hereby incorporated by reference. The misfire detection approach in the above-cited patent senses rotation of a crankshaft and calculates a crankshaft velocity based on the sensed rotation. The calculated crankshaft velocity changes or a compensated velocity change is compared to a predetermined crankshaft velocity range to determine if misfire occurred.

Despite the advances made in engine misfire detection, many of the conventional approaches still suffer some problems. First, some approaches are susceptible to detecting a false misfire which really is a disturbance caused by a previous misfire. Secondly, some approaches can be tricked into falsely identifying noise, which can be generated by drive line disturbance, as a misfire. This noise condition is commonly referred to as a "rough road" condition. Such problems exist in the prior art due in part to the assumption that misfire causes only negative acceleration values and that any positive values must solely be attributed to noise. While this is often true, there are a number of exceptions. For example, low engine speed and low frequency misfires can cause large torsional vibrations that would signal a false rough road condition. Also, certain high frequency misfires, such as the situation with a four-cylinder engine and a distributorless ignition system (DIS) where multiple cylinders share a common coil, removal of one spark plug wire may also cause a large positive change in velocity.

It is therefore one object of the present invention to provide for an improved apparatus and method of detecting cylinder misfires in an internal combustion engine.

It is another object of the present invention to provide for a misfire detection apparatus and method which is less susceptible to provide a false misfire detection caused by rough road conditions or other noise-related events.

More particularly, it is an object of the present invention to provide for a misfire detection apparatus and method which is capable of detecting misfire events and distinguishing actual misfire from noise-related events such as a rough road condition.

It is yet a further object of the present invention to provide for such a misfire detection apparatus and method which disables misfire detection upon detection of a rough road condition.

SUMMARY OF THE INVENTION

To achieve the foregoing objectives, the present invention is an apparatus and method for detecting misfire in cylinders of an internal combustion engine of a motor vehicle. The apparatus and method of the present invention are advantageously capable of detecting misfires while distinguishing misfires from a rough road condition or other noise-related conditions. Misfires in individual cylinders of the internal combustion engine are detected. Rotation of the crankshaft is sensed and deviations of change of velocity of adjacent cylinder firings are determined. A comparison value is determined as a function of change in positive deviations of change of velocity and a time decay rate. The comparison value is compared with a threshold value. The misfire detection is disabled or inhibited when the comparison value exceeds the threshold value. Further, the comparison value is reduced in accordance with the time decay rate.

BRIEF DESCRIPTION OF THE DRAWINGS

Other objects and advantages of the present invention will become apparent to those skilled in the art upon reading the following detailed description and upon reference to the drawings in which:

FIG. 6 illustrates misfire detection with a rough road condition absent misfire events according to one example of the present invention.

DETAILED DESCRIPTION OF THE PREFERRED EMBODIMENTS

Figure 1:
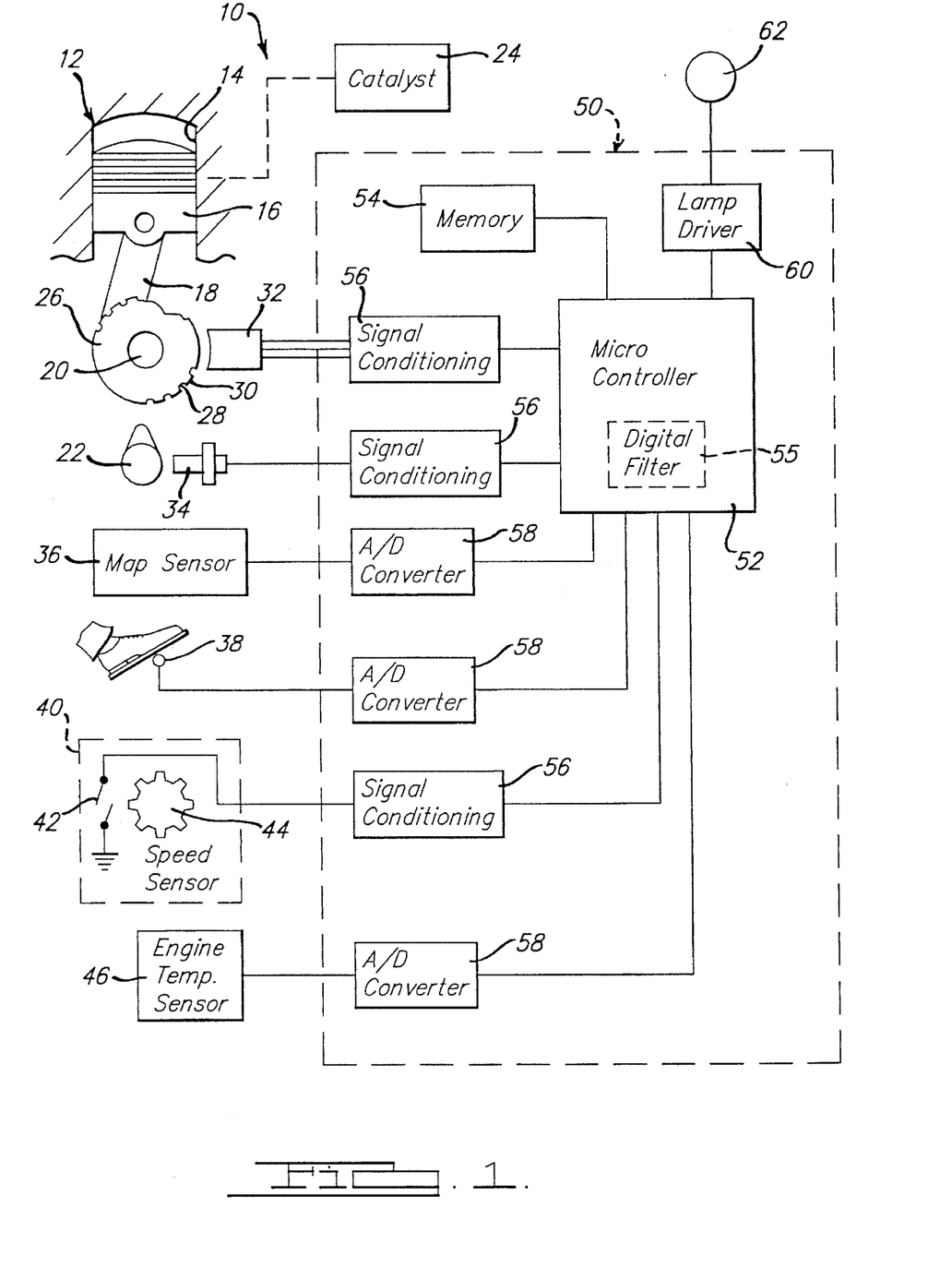
FIG. 1 is an overall block diagram illustrating a misfire detection apparatus according to the present invention.

Turning now to FIG. 1, an overall block diagram illustrating the misfire detection apparatus 10 according to a preferred embodiment of the present invention is shown therein. The misfire detection apparatus 10 is used on an internal combustion engine indicated by reference numeral 12, of a motor vehicle (not shown). A partial cut-away view of engine 12 is shown illustrating one of a multiple of cylinders 14 in the engine 12. As illustrated, a piston 16 is disposed in the cylinder 14 and is operatively connected by a connecting rod 18 to a crankshaft 20. A camshaft 22 is used to open and close at least one valve (not shown) of the cylinder 14 for various strokes of the piston 16. The piston 16 is illustrated in the expansion (power) stroke of a four stroke engine. In such a four stroke engine, the strokes include intake, compression, expansion (power), and exhaust. During the exhaust stroke, exhaust gases flow from the cylinder 14 via at least one valve and through the exhaust system (not shown). Although the preferred embodiment of apparatus 10 shows a four stroke engine, the apparatus 10 can also be applied to other internal combustion engines, such as a two stroke engine. It should also be appreciated that the apparatus 10 can also be applied to any spark-ignited or diesel engine. it should be appreciated that a spark plug is present in the preferred embodiment, although it is not illustrated herein. Additionally, a catalyst 24 of a catalytic converter (not shown) is illustrated pictorially as part of the exhaust system.

The misfire detection apparatus 10 further includes a sensor target 26 operatively connected to the crankshaft 20. The sensor target 26 has at least one, and preferably a plurality of trip points, which in the preferred embodiment are provided as slots 28, formed by teeth 30. The apparatus 10 also includes a crankshaft sensor 32 for communication with the sensor target 26 and a camshaft sensor 34 in communication with the camshaft 22. The misfire detection apparatus further includes a manifold absolute pressure (MAP) sensor 36, throttle sensor 38, a vehicle speed sensor 40 and an engine temperature sensor 46. The outputs of the sensors 36, 38, 40 and 46 communicate with an engine control unit, generally indicated by 50.

The engine control unit 50 includes a microcontroller 52 with a digital filter 55, memory 54, signal conditioning circuitry 56 and analog-to-digital (A/D) converters 58 to process outputs from the various sensors according to the misfire detection methodology to be described hereinafter. In the preferred embodiment, the outputs of crankshaft sensor 32, camshaft sensor 34, and vehicle speed sensor 40 communicate with the microcontroller 52 via appropriate signal conditioning circuitry 56 which is particularized to the type of sensor employed. The output of the MAP sensor 36, throttle position sensor 38 and engine temperature sensor 46 communicate with the microcontroller 52 via the A/D converters 58. The digital filter 55 is used to create a rough road term as will be described in more detail hereinafter. The engine control unit 50 also includes a lamp driver 60, which takes the output of the microcontroller 52 and drives an output display such as an indicator light or driver warning lamp 62. Memory 54 is a generic memory which may include Random Access Memory (RAM), Read Only Memory (ROM) or other appropriate memory. It should also be appreciated that the engine control unit 50 also includes various timers, counters and like components for the misfire detection methodology of the present invention.

Figure 2:
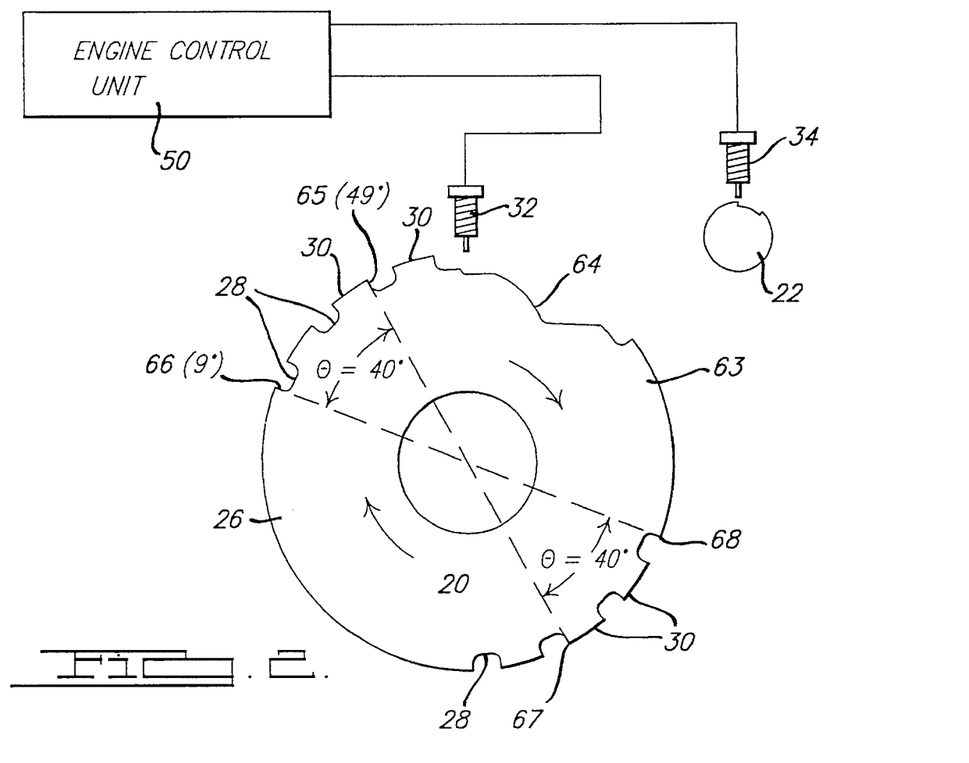
FIG. 2 is a pictorial diagram illustrating an engine crankshaft and camshaft for providing measurements for use with the misfire detection apparatus of FIG. 1.

Referring to FIG. 2, a pictorial diagram illustrating the crankshaft 20, camshaft 22, sensor target 26, crankshaft sensor 32 and crankshaft sensor 34 in communication with the engine control unit 50 is provided for the misfire detection methodology. According to one embodiment, the sensor target 26 is formed by slots 28 which are cut into a counterweight 63. The counterweight 63 is attached to or incorporated on a pulley or wheel (not shown) such as by welding, although other suitable means may be employed to securely fasten the counterweight 63 to the wheel. The wheel, in turn, is affixed to and driven by the crankshaft 20.

According to one embodiment of a four-cylinder engine, the engine 12 has four cylinders 14 oriented into a straight line configuration, resulting in a one hundred eighty degree (180°) expansion stroke for each cylinder 14. The firing order for the four cylinders 14 is 1 3 4 2. Crankshaft velocity measurements are taken by measuring the amount of time expired over an angular displacement θ for a forty degree (40°) interval of the expansion stroke for each cylinder 14 of the engine 12. Preferably, the forty degree (40°) interval is near the end of the expansion stroke. As illustrated in FIG. 2, a signature slot 64 is cut into the counterweight 63 such that a first edge 65 is a forty-nine degree (49°) edge. At least one slot 28 is cut in the counterweight 63 after the first edge 65 has formed a second edge 68 at a nine degree (9°) edge. Other slots 28 may also be cut in the counterweight 63 between the first and second edges 65 and 66 for use for ignition timing or other purposes. It should be appreciated that the first edge 65 identifies cylinder numbers 1 and 4 of the cylinders 14.

The sensor target 26 includes at least two other slots 28 to form a third edge 67 and a fourth edge 68 opposite or one hundred degrees (180°) from the first edge 65 and second edge 66, respectively. Optionally, other slots 28 may also be cut in the counterweight 63 between the third and fourth edges 67 and 68 for use for ignition timing or other purposes. it should be appreciated that the third edge 67 identifies cylinder numbers 3 and 2 of the cylinders 14. It should also be appreciated that the third edge 67 is a forty-nine degree (49°) edge and the fourth edge 68 is a nine degree (9°) edge.

According to another embodiment, a six-cylinder engine has six cylinders in an overlapping configuration resulting in a one hundred twenty degree (120°) expansion stroke for each cylinder 14 of engine 12. For the six-cylinder engine, crankshaft velocity measurements are preferably taken over an angular displacement θ for a sixty degree (60°) interval of the expansion stroke. The sixty degree (60°) interval is measured from a sixty-nine degree (69°) edge and a nine degree (9°) edge. While four cylinder and six-cylinder engines are described herein, it should be appreciated that the present invention applies to various other size multi-cylinder engines.

The crankshaft sensor 32 is used to measure position markings, namely edges 65–68, for use in determining crankshaft velocity. The crankshaft sensor 32 is located at top dead center (TDC) position relative to the crankshaft centerline and mounted near the sensor target 26. In one embodiment, the crankshaft sensor 32 may be a Hall effect sensor. it should also be appreciated that other sensors such as optical sensors or variable reluctance sensors may also be used according to other embodiments.

The camshaft sensor 34 is used to identify specific cylinder firings. Since the camshaft 22 rotates 360° for every 720° of rotation of crankshaft 20, identification of a given cylinder can be determined. Such identification will assist in pinpointing exactly what cylinder or cylinders are misfiring. Although the preferred embodiment uses a stock distributor and algorithm to determine top dead center (TDC) of the number 1 cylinder, cylinder identification techniques may vary with different engines. It should also be understood that the camshaft sensor 34 and camshaft 25 are conventional components generally known in the art.

Figure 3:
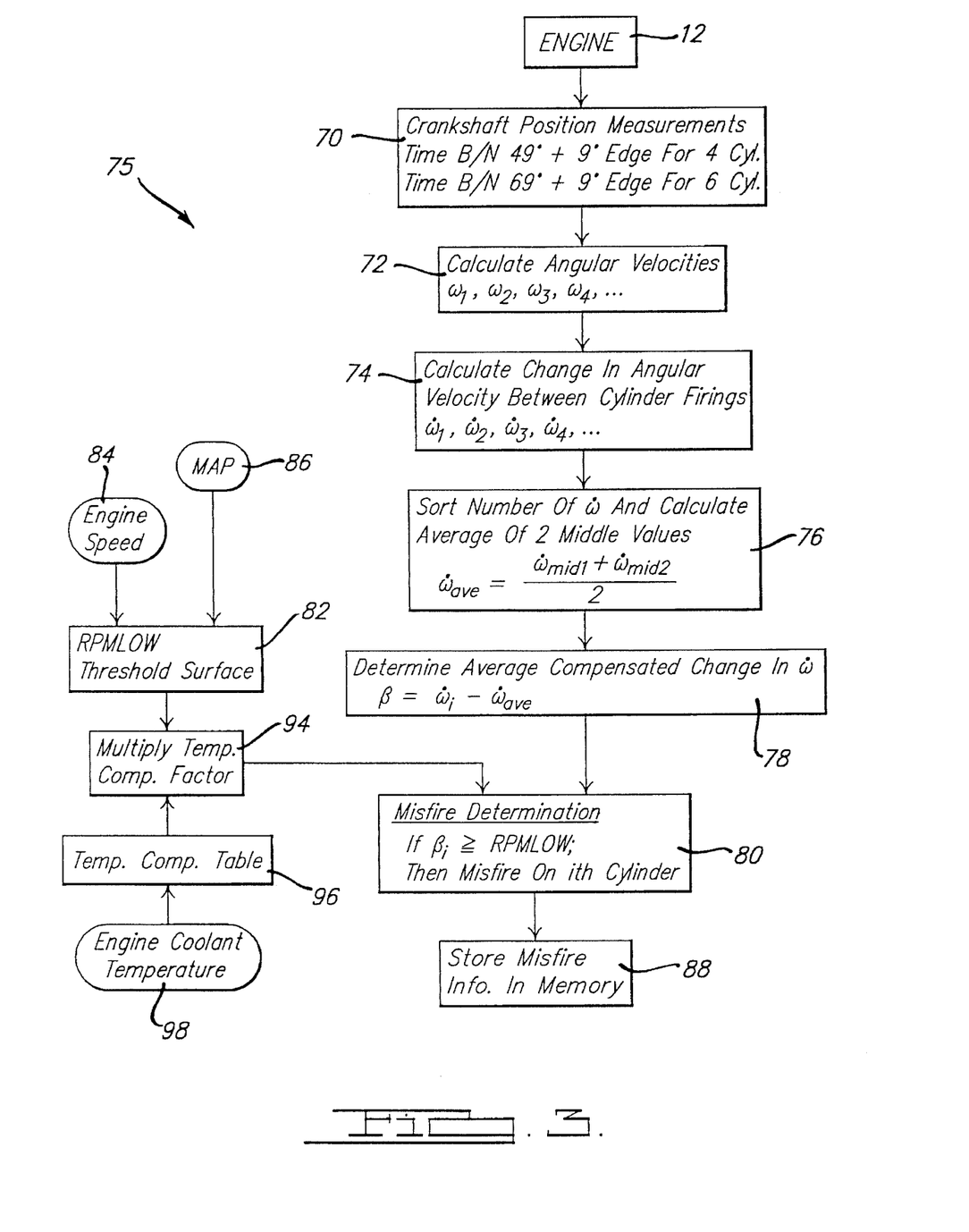
FIG. 3 is a detailed flow diagram illustrating a methodology for detecting cylinder misfires in a multi-cylinder engine.

Referring to FIG. 3, a flow chart illustrating the method 75 for detecting cylinder misfires of engine 12 is shown therein. The misfire detection methodology 75 generally begins at block 70. During operation of engine 12, crankshaft position measurements are taken over a predefined angular displacement of the crankshaft 20 during an expected cylinder firing for each cylinder 14 of engine 12. The position measurements are preferably obtained by measuring a time interval (T) expired during rotation of the crankshaft 20 through the predefined angular displacement θ. This is accomplished by microcontroller 52 starting a timer when crankshaft sensor 32 detects first edge 65 for a four-cylinder engine. For the four-cylinder engine application, the timer is stopped after a forty degree (40°) rotation when sensor 32 detects second edge 66. For the next cylinder firing, a timer is likewise started when crankshaft sensor 32 detects the third edge 67 and is stopped after a forty degree (40°) rotation when sensor 32 detect fourth edge 68. For a six-cylinder engine application, the preferred timer measurements are taken over a sixty degree (60°) angular rotation interval.

The methodology 75 advances to step 72 wherein the individual of the time intervals (T) measured by the microcontroller 52 are used by the microcontroller 52 to calculate an angular velocity (RPM) value ω of the crankshaft for the corresponding cylinder. This is generally accomplished by dividing the angular displacement θ by the corresponding time (T) measurement. The position time measurements and angular velocity calculations are continually repeated for each cylinder firing event to obtain a series of angular velocities $\omega_1$, $\omega_2$, $\omega_3$, $\omega_4$, $\omega_5$, $\omega_6$ ..., etc. corresponding to respective cylinders 1, 3, 4, 2, 1, 3, ..., for example.

The misfire detection methodology 75 proceeds to step 74 in which microcontroller 52 calculates changes in angular velocity ω which correspond to each expected cylinder firing event. The change in angular velocity for a current cylinder (i) is calculated by determining the difference between angular velocity for the current cylinder (i) and the following successive cylinder (i+1). According to one embodiment described herein, the following velocity is subtracted from the current velocity so that velocity changes for a misfire yield positive values. Likewise, the current velocity can be subtracted from the following velocity. The calculated changes in angular velocity are represented by $\omega_1$, $\omega_2$, $\omega_3$, $\omega_4$, etc. The angular velocity changes ω are continually calculated from one cylinder firing event to another and may be accumulated in a consecutive series of angular velocity changes which may be saved in memory 54 or calculated from stored velocity information ω.

Proceeding to step 76, selected changes in angular velocity are sorted by amplitude and an average of the two middle values $\omega_{MID1}$ and $\omega_{MID2}$ and the average values represented by $\omega_{ave}$. The selected changes in angular velocity are preferably chosen from a window of a continuous series of consecutive changes in angular velocity ω. The selected series may include the current change in angular velocity $\omega_1$ for the current cylinder firing event (i) and adjacent changes in angular velocity. For a four-cylinder engine, the window preferably contains four changes in angular velocity which includes the angular velocity change for the current cylinder $\omega_1$, the single previous cylinder firing event $\omega_{i-1}$ and the two successive following cylinder firing events $\omega_{i+1}$ and $\omega_{i+2}$. For a six-cylinder engine, the window preferably contains six consecutive angular velocity changes which include the current change in angular velocity ω for a cylinder firing event (i), the three previous consecutive cylinder firing events and the following two cylinder firing events. A more detailed description of the selected changes in angular velocity is provided in co-filed application Ser. No. 08/468,117 titled "Engine Misfire Detection with Compensation for Normal Acceleration of Crankshaft".

Next, an average compensated change in angular velocity change is determined as shown in step 78. This is preferably accomplished by comparing the current change in angular velocity $\omega_1$ with the average angular velocity change $\omega_{AVE}$ to determine the average compensated change in angular velocity change as represented by β. Preferably, β is determined by subtracting the average angular velocity change $\omega_{AVE}$ from the current angular velocity change $\omega_i$.

The average compensated change in angular velocity change β is used to determine misfire on the current cylinder as provided by step 80 of the methodology 75. More particularly, the average compensated change in angular velocity change β is compared with a predetermined threshold value (RPMLOW) to determine if a misfire has been detected. The predetermined threshold value (RPMLOW) is retrieved from a threshold surface 82 of information stored in memory or a state machine. Threshold value RPMLOW is a function of engine speed and manifold pressure (MAP) and can be retrieved from a mapped surface. The RPMLOW threshold value is preferably looked up as a function of engine speed and manifold pressure as presented during the misfire determination with the current cylinder firing event. Accordingly, engine speed is monitored, as well as manifold pressure, while microprocessor 52 determines changes in engine speed.

Additionally, the selected RPMLOW threshold value may optionally be multiplied by a temperature compensation factor 94 in order to compensate for a cold engine condition. In doing so, current engine temperature 98 is measured and a temperature compensation factor is looked up in a compensation table 96. This compensation table factor is then multiplied by the selected RPMLOW threshold value and used as the comparison value RPMLOW for misfire determination in step 80.

When a misfire event is detected, the cylinder 14 is identified by the camshaft sensor 34 and the crankshaft sensor 32 and the cylinder misfire information is stored in memory according to step 88. The accumulated misfire information may be retrieved and used to determine the cause of an engine problem. Additionally, the number of misfires may be evaluated by the microcontroller 52 to determine whether a given rate of misfire would cause premature failure of the catalyst 24. If catalyst failure is indicated, the cylinder number of identification may be recorded by microcontroller 52 and the driver warning lamp 62 can be illuminated by the lamp driver 60. Nonetheless, the driver warning lamp 62 can be illuminated to indicate one or more misfire events.

Figure 4:
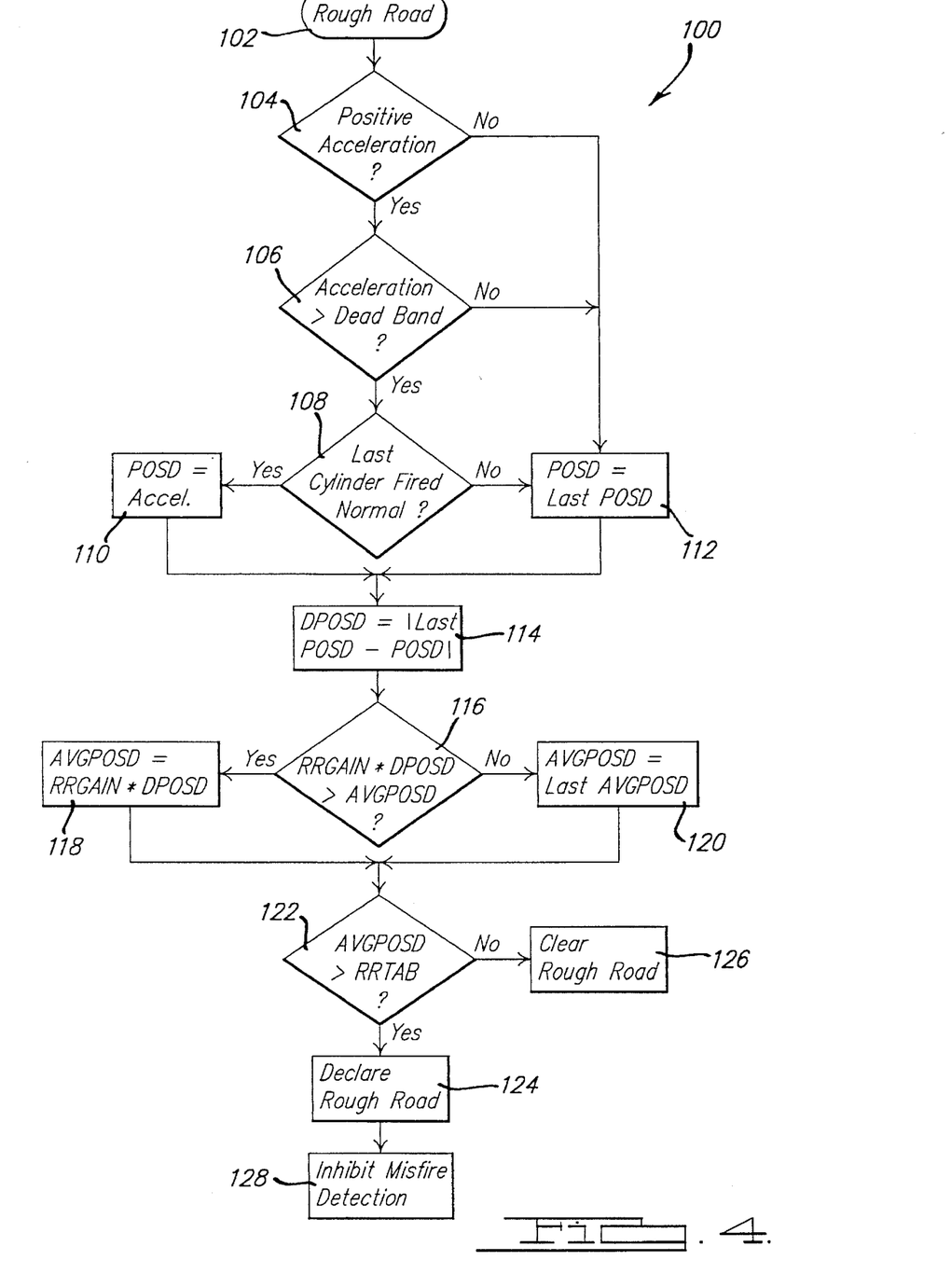
FIG. 4 is a flow diagram illustrating controlled misfire detection and detection of noise-related events such as a rough road condition according to the present invention.

With particular reference to FIG. 4, the methodology 100 for providing misfire detection with misfire detection inhibit for a rough road condition is provided according to the present invention. The methodology 100 normally provides for the misfire detection as previously described and is able to detect and distinguish a rough road condition from an actual misfire event. As previously mentioned, noise can be generated by drive line disturbances which can be caused by a rough road condition or other noise related event. When a rough road condition is detected, the system and method of the present invention is able to inhibit misfire detection until the rough road condition is no longer detected.

The misfire detection with inhibit methodology 100 begins at initial step 102 where the steps for detecting a rough road condition begin. Given the calculated change in angular velocity ω between expected cylinder firings, the methodology 100 initially determines a positive change in angular velocity ω value hereinafter referred to as POSD. This is accomplished by looking for positive changes in angular velocity or acceleration as provided in step 104. If positive acceleration is not present, the positive ω value POSD is set equal to the last positive ω value POSD as provided in step 112. Otherwise, if positive acceleration is detected, the acceleration is compared to a noise threshold deadband as provided in step 106. The noise threshold deadband filters out low amplitude signals which are generally noise induced. If the acceleration value exceeds the noise threshold deadband, the methodology 100 will look to see if the last cylinder fired normal as provided in step 108. Otherwise, if the acceleration does not exceed the noise threshold deadband, the positive ω value POSD is set equal to the last positive ω value POSD as provided in step 112.

Referring back to step 108, if the last cylinder fired is normal, the positive ω value POSD is set equal to the current acceleration as detected for the current cylinder (i) firing event, pursuant to step 110. If the last cylinder fired was not normal, the positive ω value POSD is set equal to the last positive ω value POSD as provided in step 112.

Once the positive ω value POSD is determined, the methodology 100 proceeds to step 114 in order to calculate the absolute value of the difference between the last positive ω value POSD and the determined positive ω value POSD. The absolute value of this difference between the last and the determined values of POSD is represented by DPOSD. Next, the absolute value of the change in positive ω value as represented by DPOSD is multiplied by a rough road gain factor, represented by RRGAIN, and compared with an average positive ω value which is represented by AVGPOSD. The rough road gain factor RRGAIN is a multiplicative constant which determines sensitivity and is set to achieve a desired sensitivity. If the product of the gain factor RRGAIN and absolute value of the differences in positive ω value DPOSD exceeds the average positive value AVGPOSD, then the average positive value AVGPOSD is set equal to the product of the gain factor RRGAIN and the change in positive ω value DPOSD as provided in step 118. Otherwise, the average positive value AVGPOSD is set equal to the last average positive value AVGPOSD which was used during the last firing event as provided in step 120.

Once the average positive value AVGPOSD is determined, the methodology 100 proceeds to step 122 and makes a comparison of the average positive value AVGPOSD with a rough road threshold value which is represented by RRTAB. The rough road threshold value RRTAB is retrieved from a threshold surface of information stored in memory or a state machine. Threshold value RRTAB is a function of engine speed (RPM) and manifold pressure (MAP) and can be retrieved from a mapped surface. By looking up engine speed and manifold pressure, the rough road threshold value RRTAB can be retrieved from the mapped surface in a manner similar to that for retrieving threshold RPMLOW as previously described herein.

Figure 5:
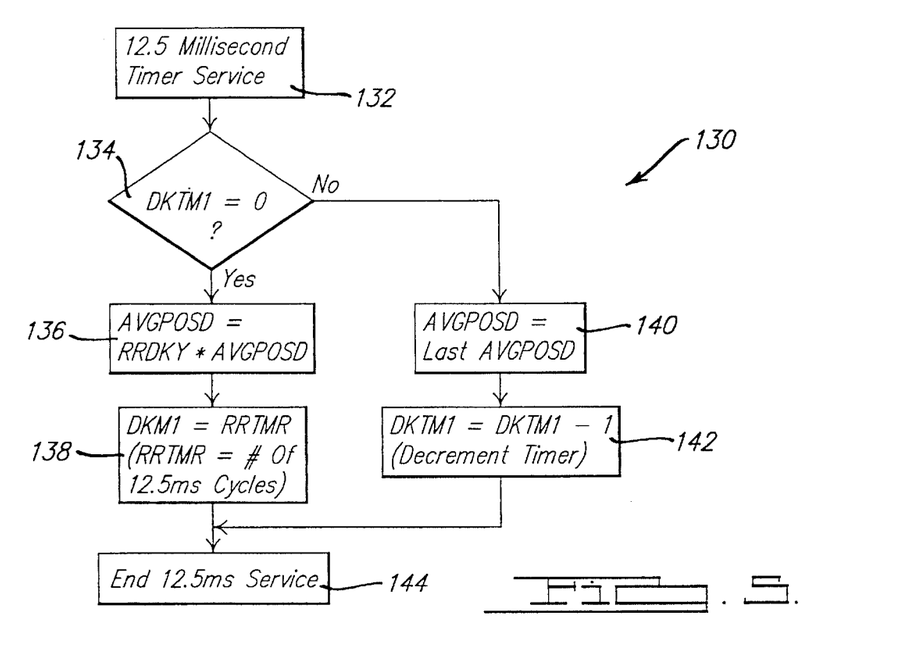
FIG. 5 is a flow diagram illustrating steps performed by a decay timer for achieving a time decay rate in accordance with the present invention.

The average positive value AVGPOSD may vary in response to a digital filter with a time decay rate to create a modified average value as shown by the method 130 illustrated in FIG. 5. Referring to FIG. 5, the methodology 130 for the decay timer is provided with a 12.5 millisecond timing cycle. Beginning with step 132, a 12.5 millisecond timer service is initiated. Next, in step 134, the methodology 130 looks to see if a countdown variable DKTM1 has reached zero. Normally, the countdown variable DKTM1 is reset to a predetermined value which is retrieved from a look-up table. For example, if the countdown variable DKTM1 is set equal to a value of ten, with a 12.5 millisecond cycle, a 125 millisecond time period is required for variable DKTM1 to reach zero.

Once countdown variable DKTM1 reaches zero, the methodology 130 proceeds to step 136 where the average positive value AVGPOSD is multiplied by a decay rate, which is represented by RRDKY, to create a modified average value for AVGPOSD. For example, decay rate RRDKY may be set equal to 0.95 which will set the new average value AVGPOSD equal to 95% of its previous value. After the average value AVGPOSD is modified, the countdown variable DKTM1 is reset to the predetermined value RRTMR which is retrieved from a look-up table as provided in step 138. Thereafter the methodology proceeds to step 144 which ends one cycle of the methodology 130 and the next cycle of decay timer may begin. If the countdown variable DKTM1 has not yet decremented to zero, the average positive value AVGPOSD is set equal to the last used value and the countdown variable DKTM1 is decremented by one as provided in step 142. Thereafter, methodology 130 proceeds to the last step 144 of the cycle.

Returning back to FIG. 4, if the average positive value AVGPOSD exceeds the rough road threshold value RRTAB, a rough road condition is detected pursuant to step 124 and a rough road condition is declared. With a rough road condition detected and declared, misfire detection is inhibited pursuant to step 128. The above described steps provided for methodology 100 are repeated for each expected firing event. As provided in step 126, the rough road condition is cleared once the average positive value AVGPOSD no longer exceeds the rough road threshold RRTAB. When this occurs, normal misfire detection will no longer be inhibited.

Figure 7:
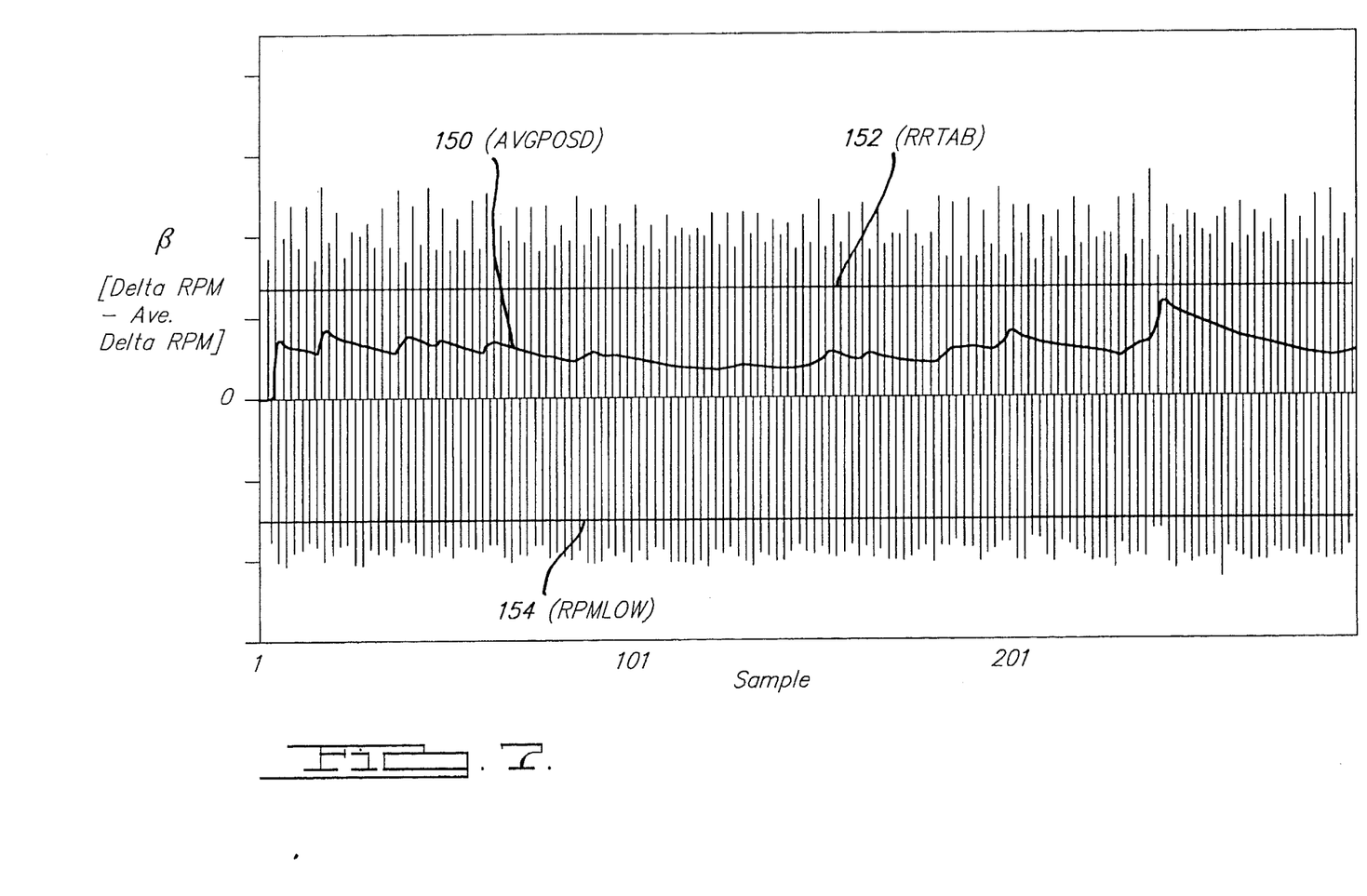
FIG. 7 illustrates misfire detection with misfires and absent any rough road condition according to another example.

Referring now to FIGS. 6 and 7, examples of the misfire detection with rough road inhibit are shown in the graphs provided therein. With particular reference to FIG. 6, the average compensated change in ω is shown for a number of expected cylinder firing events. For the example provided in FIG. 6, no misfires occur. To detect a rough road condition, only positive changes in angular velocity or positive acceleration values are considered. The average positive value AVGPOSD is determined and is shown as line 150. The rough road threshold RRTAB is shown as line 152. Whenever the average positive value AVGPOSD is greater than or equal to the rough road threshold value RRTAB, misfire detection is inhibited until the average positive value AVGPOSD drops below the threshold value RRTAB. The average positive value AVGPOSD will increase with an increase in the product of the gain factor RRGAIN and change in positive ω value DPOSD. The average positive value AVGPOSD will decrease as a function of the time decay rate.

With the use of the digital filter 55, a time decay rate is used to adjust the average positive value AVGPOSD. The average positive value AVGPOSD is reduced by a selected percentage of say 5% according to one example, so as to reduce the average positive value AVGPOSD at predetermined time periods as long as AVGPOSD exceeds zero. Once the average positive value AVGPOSD exceeds or is equal to the threshold value RRTAB, misfire detection is inhibited as shown in FIG. 6. This occurs when subjected to a high amount of noise such as a rough road condition.

Referring to FIG. 7, an example of misfire detection given a 50% misfire rate and no rough road condition present is provided therein. The RPMLOW threshold is illustrated by line 154. As shown, a large number of misfire events occur, while the average positive value AVGPOSD continues to allow misfire detection to occur, unless a rough road condition is detected.

While a specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and changes that various changes, modifications and variations can be made therein without departing from the spirit and scope of the present invention as described in the following claims.

What is claimed is:

1. A method of detecting misfires in individual cylinders of an internal combustion engine and being operable to reduce noise effects, said method comprising the steps of:

detecting misfires in individual cylinders of the internal combustion engine;

sensing rotation of a crankshaft;

determining deviations of change of velocity of adjacent expected cylinder firings;

determining a comparison value as a function of change in positive deviations of change of velocity and a time decay rate;

comparing the comparison value with a threshold value;

disabling the misfire detection when the comparison value exceeds the threshold value; and reducing the comparison value with the time decay rate.

2. The method as defined in claim 1 further comprising the step of continuing misfire detection when the comparison value no longer exceeds the threshold value.

3. The method as defined in claim 1 further comprising the step of retrieving the threshold value from a mapped surface as a function of manifold pressure and engine speed.

4. The method as defined in claim 1 wherein said steps are repeated for each expected cylinder firing event.

5. The method as defined in claim 1 wherein said comparison value increases as a function of the change in positive deviations of change of velocity and decreases as a function of the time decay rate.

6. The method as defined in claim 1 wherein said comparison value is a function of absolute value of change in positive deviations of change of velocity.

7. An apparatus for detecting misfire in individual cylinders of an internal combustion engine and inhibiting misfire detection during noise related events, said apparatus comprising:

means for detecting misfires in individual cylinders of the internal combustion engine;

means for sensing rotation of a crankshaft;

means for determining deviations of change of velocity of adjacent expected cylinder firings;

means for determining a comparison value as a function of change in positive deviations of change of velocity and a time decay rate;

means for comparing the average comparison value with a threshold value;

means for disabling the misfire detection when the comparison value exceeds the threshold value; and means for reducing the comparison value with the time decay rate.

8. The apparatus as defined in claim 7 further comprising a digital filter for providing the time decay rate.

9. The apparatus as defined in claim 7 further comprising memory means for storing the threshold value as a function of manifold pressure and engine speed.

10. The apparatus as defined in claim 7 wherein said comparison value is a function of absolute value of change in positive deviations of change of velocity.

* * * * *